United States Patent Office 3,499,925
Patented Mar. 10, 1970

3,499,925
PROCESS FOR THE PRODUCTION OF TRANS-4-AMINOMETHYLCYCLOHEXANE - 1 - CARBOXYLIC ACID
Takeo Naito, Ichikawa-shi, Atsuji Okano, Tokyo, Takaaki Aoyagi, Fujisawa-shi, Tosaku Miki, Tokyo, Shizuo Kadoya, Yohohama-shi, Masato Inaoka, Funabashi-shi, and Motonori Shindo, Tokyo, Japan, assignors to Daiichi Seiyaku Company Limited, Nihonbashi, Tokyo, Japan, and Mitsubishi Chemical Industries Limited, Chiyoda-ku, Tokyo, Japan, both corporations of Japan
No Drawing. Filed Feb. 24, 1965, Ser. No. 435,074
Claims priority, application Japan, Mar. 23, 1964, 39/15,791; July 6, 1964, 39/38,521
Int. Cl. C07c 51/00, 61/08, 101/04
U.S. Cl. 260—514                              12 Claims

ABSTRACT OF THE DISCLOSURE

Cis-4-aminomethylcyclohexane-1-carboxylic acid or a mixture of cis- and trans-4-aminomethylcyclohexane-1-carboxylic acid is heated at a temperature of between 160° C. and 250° C. in the presence of an alkaline agent in a solvent to produce trans-4-aminomethylcyclohexane-1-carboxylic acid, and trans-4-aminomethylcyclohexane-1-carboxylic acid is recovered from the reaction mixture.

This invention relates to a process for the production of trans-4-aminomethylcyclohexane - 1 - carboxylic acid which comprises isomerizing cis-4-aminomethylcyclohexane-1-carboxylic acid or the same contained in a mixture of cis- and trans-4-aminomethylcyclohexane-1-carboxylic acid.

An object of the present invention is to provide an improved and economical process for producing trans-4-aminomethylcyclohexane-1-carboxylic acid.

Other objects and advantageous features of the present invention will appear from the following detailed description.

4-aminomethylcyclohexane-1-carboxylic acid has been known as a valuable substance for pharmaceutical use, and it is specifically pointed out in Belgian Patent No. 617,216 that the compound has an antiplasmic activity and an excellent therapeutic effect on disorders caused by the activated plasmin in vivo. However, the present inventors found that there exist two stereo isomers of the compound and that the trans-isomer has a far stronger antiplasmic activity than the cis-isomer. On the basis of this knowledge, the present inventors succeeded in synthesizing the trans-isomer starting from trans-4-cyanocyclohexane-1-carboxylic acid or its lower alkyl ester, and filed an application for patent (U.S. Ser. No. 418,325).

It was desirable, however, from the industrial point of view, to convert the cis-isomer or a mixture of the cis- and trans-isomers into the trans-isomer which has significant value as a medicine.

As for the already known references, according to Liebig's Annalen der Chemie, volume 301, page 194 (1900), two isomers of 4-aminomethylcyclohexane-1-carboxylic acid were denoted as α-isomer (readily soluble in methanol) and β-isomer (hardly soluble in methanol), and the β-isomer was heated under reflux in the presence of sodium and amylalcohol in order to convert it into the α-isomer. By this method, however, the β-isomer was only partially isomerized, but a 100% isomerization could not be achieved. Therefore, the α-isomer was separated from the reaction product by means of a complicated recrystallization method utilizing the difference in solubility between the two isomers. However, the purity of the α-isomer obtained by this method, judging from the described decomposition point, can not be said to be sufficient.

The present inventors have developed a process of changing cis-4 - aminomethylcyclohexane - 1 - carboxylic acid or a mixture of cis- and trans-4-aminomethylcyclohexane-1-carboxylic acid into the trans-isomer.

The present invention is a process for the production of trans-4-aminomethylcyclohexane - 1 - carboxylic acid which comprises heating cis-4-aminomethylcyclohexane-1-carboxylic acid or a mixture of cis- and trans-4-aminomethylcyclohexane-1-carboxylic acid at 160–250° C. for a number of hours under atmospheric or increased pressure in the presence of an alkaline agent selected from the group consisting of alkali metals, alkali metal amides, alkali metal alcoholates, alkali metal hydroxides, alkali metal carbonates, alkali metal bicarbonates, alkaline earth metal oxides and hydroxides in a solvent selected from the group consisting of water, aliphatic alcohols having straight carbon chain, branched carbon chain having 1–8 carbon atoms alicyclic alcohols and nitrogen-containing hetero-cyclic amines, thereby to transform the cis-isomer into the trans-isomer.

More specifically, sodium, potassium or lithium metal and alkaline compounds thereof such as amides, alcoholates, hydroxides, carbonates and bicarbonates can be employed as the above mentioned alkali metals and alkali metal compounds. Barium or calcium oxide and hydroxide can be employed as the above mentioned alkaline earth metal oxides and hydroxides. As the solvent, water, various alcohols such as methyl, ethyl, n-propyl, isopropyl, n-butyl, isobutyl, tert-butyl, n-amyl, isoamyl, n-hexyl, n-heptyl, n-octyl alcohol, 2-ethylhexanol or cyclohexyl alcohol; or nitrogen-containing heterocyclic amines such as pyridine, picoline or quinoline can be employed. The reaction is carried out at 160–250° C., preferably at 180–200° F., under atmospheric pressure when solvents having boiling point of higher than 180° C. are selected from the above-said solvents, while it is carried out in an autoclave at the same temperature when solvents having boiling point of lower than 180° C. are selected. It is necessary to continue heating for more than 4 hours, but it is not preferable to continue it for too long a period because a side reaction may occur to reduce the yield. When a mixture of the two isomers is employed as the starting material, the isomerization reaction proceeds completely in the same manner regardless of the ratio of the two isomers in the mixture.

Thereafter, the treatment is carried out as follows:

(1) When alkali metals or alkali metal compounds are employed as the alkaline agent.—The reaction solution is, when water-soluble organic solvents are employed, concentrated under reduced pressure and the residue is dissolved in water. When water-insoluble organic solvents are employed, water is added to the reaction solution or to the residue obtained by distilling off the solvent from the reaction solution under reduced pressure. Thus the desired product is extracted as an aqueous solution.

When water is employed as the solvent, the reaction solution can be used as it is in the following process. In order to eliminate alkali metal ions from the aqueous solution of the reaction product obtained as described above, the aqueous solution is passed through a column of an acidic cation ion-exchange resin. The eluate is concentrated and acetone or ethanol is added to the solution to precipitate the crystals of the desired product.

(2) When alkaline earth metal hydroxides or oxides are employed as the alkaline agent.—An adequate amount of dilute sulfuric acid is added to the reaction solution to precipitate alkaline earth metal ions as barely soluble sulfate, such as barium sulfate or calcium sulfate.

According to another method, carbon dioxide gas is introduced into the reaction solution to precipitate barely soluble barium carbonate or calcium carbonate.

According to another method, phosphoric acid or oxalic acid is added to the reaction solution to precipitate alkaline earth metal salts of the acids.

Thus, inorganic ions contained in the reaction solution are removed easily by means of a very simple process.

When an excess of the acids or carbon dioxide gas are used in the above processes, anionic ions which are likely to get mixed in the product can be removed by passing the solution through a column of a small amount of a weakly basic ion-exchange resin.

The filtrate is concentrated and the residue is recrystallized from water-acetone or water-acetone-methanol to give crystals of trans-4-aminomethylcyclohexane-1-carboxylic acid.

Trans-4-aminomethylcyclohexane - 1 - carboxylic acid which has the stereo conformation:

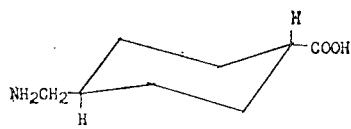

is a colorless powder having the melting point of 380–390° C. (decomp. uncorrect. in air bath) and has characteristic infra-red absorptions at 1637, 1535 and 1383 cm.$^{-1}$.

Certain salts of trans-4-aminomethylcyclohexane-1-carboxylic acid have the following melting points:

HCl salt ($C_8H_{15}NO_2 \cdot HCl$) 238–240° C. (decomp.).
HBr salt ($C_8H_{15}NO_2 \cdot HBr$) 227–229° C. (decomp.).
Au salt ($C_8H_{15}NO_2 \cdot HCl \cdot AuCl_3$) 204–206° C. (decomp.).
Pt salt (($C_8H_{15}NO_2 \cdot HCl)_2PtCl_4$) 254–255° C. (decomp.).

Cis-isomer which has the stereo conformation:

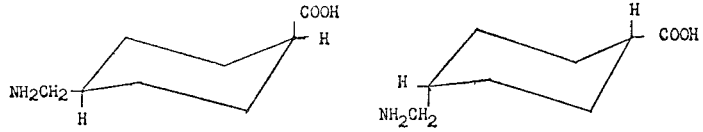

is a colorless powder having the melting point of 238–242° C. (decomp.) and has characteristic infra-red absorptions at 1640, 1565, 1515, 1415 and 1310 cm.$^{-1}$.

Trans-4-aminomethylcyclohexane-1-carboxylic acid is soluble in six times its volume of water at room temperature but is insoluble in methanol. Furthermore, the hydrochloric acid salt of cis-4-aminomethylcyclohexane-1-carboxylic acid is more soluble in methanol than that of trans-4-aminomethylcyclohexane-1-carboxylic acid.

To confirm the stereo conformation of both isomers, the spectra of nuclear magnetic resonance absorption are taken from a heavy water solution of samples by using dioxane as internal standard material at room temperature. In this spectrum, trans-4-aminomethylcyclohexane-1-carboxylic acid shows sharp doublet signals at 51 and 56 c.p.s. on the higher magnetic field side than that of dioxane, which are signals of a methylene group in aminomethyl group, a broad signal having about 30 c.p.s. of half value wide at about 95 c.p.s., which is considered a signal of hydrogen atom bound to carbon atom binding the carboxyl group, because it transferred by about 10 c.p.s. to the lower magnetic field side by the addition of hydrochloric acid, and a broad signal having about 60 c.p.s. of half-value side at about 130 c.p.s., which is a signal of ring methylene group. Cis-4-aminomethylcyclohexane-1-carboxylic acid shows sharp doublet signals at 45 and 51 c.p.s. on the higher magnetic field side than that of dioxane which are signals of methylene group in aminomethyl group, broad signal having about 15 c.p.s. of half-value wide at about 85 c.p.s. which is considered a signal of hydrogen atom bound to carbon atom binding carboxyl group from the view point that it is transferred by about 20 c.p.s. to the lower magnetic field side by the addition of hydrochloric acid, and a broad signal having about 25 c.p.s. of half-value wide at about 130 c.p.s., which is a signal of ring methylene group.

In comparison between the spectra of both isomers, the signal of ring methylene group of trans-4-aminomethylcyclohexane-1-carboxylic acid has twice half-value wide as that of cis-4-aminomethylcyclohexane-1-carboxylic acid. And the signal of hydrogen atom bound to carbon atom binding carboxyl group of trans-4-aminomethylcyclohexane-1-carboxylic acid mentioned above exists on the higher magnetic field side and has broader half-value wide than that of cis-4-aminomethylcyclohexane-1-carboxylic acid mentioned above. Accordingly, the hydrogen atom is supposed to be bound axially to cyclohexane ring of trans - 4 - aminomethylcyclohexane - 1 - carboxylic acid mentioned above.

It is concluded that trans-4-aminomethylcyclohexane-1-carboxylic acid mentioned above is truely trans-isomer of 4-aminomethylcycohexane-1-carboxylic acid for the following reasons:

(1) Assumed trans-4-aminomethylcyclohexane-1-carboxylic acid is prepared by hydrogenation of trans-4-cyanocyclohexane-1-carboxylic acid.

(2) Assumed trans-4-aminomethylcyclohexane-1-carboxylic acid is oxidized by potassium permanganate to give known trans-hexahydroterephthalic acid, while assumed cis-4-aminomethylcyclohexane-1-carboxylic acid gives known cis-hexahydroterephthalic acid by the same procedure.

(3) The melting point of assumed trans-4-aminomethylcyclohexane-1-carboxylic acid is higher than that of assumed cis-4-aminomethylcyclohexane-1-carboxylic acid.

(4) In the nuclear magnetic resonance spectra, the signal of ring methylene group of assumed trans-4-aminomethylcyclohexane-1-carboxylic acid has twice half-value wide as that of assumed cis-4-aminomethylcyclohexane-1-carboxylic acid.

(5) The signal of hydrogen atom bound to carbon atom binding carboxyl group of assumed trans-4-aminomethylcyclohexane-1-carboxylic acid exists on the higher magnetic field side, and has broader half-value wide than that of assumed cis-4-aminomethylcyclohexane-1-carboxylic acid.

(6) The infra-red spectrum of assumed trans-4-aminomethylcyclohexane-1-carboxylic acid is more simple than that of assumed cis-4-aminomethylcyclohexane-1-carboxylic acid.

Trans-4-aminomethylcyclohexane - 1 - carboxylic acid produced by the process of the present invention has a potent inhibitory action on the plasmin system, and also an excellent therapeutic effect on disorders associated with and/or caused by the activated plasmin in vivo, without any accompanying noticeable toxicity when applied.

Some preferred embodiments of the present invention will be described in detail wherein the examples given are for the purpose of illustrating preferred embodiments only and not for the purpose of limiting the same.

Example 1

In an autoclave, 2 g. of a mixture of cis- and trans-4-aminomethylcyclohexane-1-carboxylic acid, which is obtained by catalytic reduction of p-aminomethylbenzoic acid in the presence of platinum catalyst and contains 60% by weight of cis-isomer was reacted at 200° C. for 8 hours with 20 ml. of ethyl alcohol in which 0.44 g. of sodium metal had been dissolved. After cooling, the reaction solution was concentrated under a reduced pressure to give a white residue. This residue was dissolved in 40 ml. of water and passed through a column of a strongly acidic cation ion-exchange resin ($NH_4^+$). The eluate was concentrated under reduced pressure to form a white mass. An adequate amount of acetone was added thereto and 1.95 g. of white powder was obtained. This powder was recrystallized from water-acetone to give 1.85 g. (yield: 92.5%) of white crystalline powder having a melting point of 380–390° C. (decomp.). This product was identified as trans-4-aminomethylcyclohexane-1-carboxylic acid by means of infra-red spectrum.

Example 2

In an autoclave, 2.0 g. of cis-4-aminmethylcyclohexane-1-carboxylic acid was reacted at 210° C. for 16 hrs. with 0.76 g. of sodium hydroxide in 20 ml. of water. After cooling, the reaction solution was treated in the same manner as in Example 1. The obtained product was recrystallized from water-acetone to give 1.91 g. (yield: 95.5%) of crystals having a melting point of 380–390° C. (decomp.).

Example 3

1.0 g. of a mixture of cis- and trans-4-aminomethyl-cyclohexane-1-carboxylic acid containing 60% by weight of cis-isomer and 10 ml. of 2-ethylhexanol in which 0.22 g. of sodium metal had been dissolved was heated under reflux for 14 hrs. After cooling, the reaction solution was shaken with 10 ml. of water and then the aqueous layer was separated. The extraction was repeated twice with 8 ml. each of water and the extracts were united. The extracts were treated in the same manner as in Example 1, and thus 0.94 g. (yield: 94%) of white crystals having a melting point of 380–390° C. (decomp.) were obtained.

Example 4

In an autoclave, 2.0 g. of a mixture of cis- and trans-4-aminomethylcyclohexane-1-carboxylic acid containing 65% by weight of cis-isomer was reacted at 190° C. for 12 hrs. with 20 ml. of tert-butyl alcohol in which 0.74 g. of potassium metal had been dissolved. The reaction solution was treated in the same manner as in Example 1, and thus 1.84 g. (yield: 92.0%) of trans-4-aminomethylcyclohexane-1-carboxylic acid was obtained.

Example 5

In an autoclave, 2.0 g. of a mixture of cis- and trans-4-aminomethylcyclohexane-1-carboxylic acid containing 60% by weight of cis-isomer was reacted at 185° C. for 6 hrs. with 20 ml. of amyl alcohol in which 1.2 g. of sodium ethylate had been dissolved. The reaction solution was treated in the same manner as in Example 1 to give 1.8 g. (yield: 90.0%) of trans-4-aminomethylcyclohexane-1-carboxylic acid.

Example 6

1.0 g. of a mixture of cis- and trans-4-aminomethyl-cyclohexane-1-carboxylic acid containing 70% by weight of cis-isomer, 0.38 g. of sodium amide and 10 ml. of n-octyl alcohol was heated under reflux for 14 hrs. The reaction solution was treated in the same manner as in Example 3 to give 0.91 g. (yield: 91.0%) of trans-4-aminomethylcyclohexane-1-carboxylic acid.

Example 7

In an autoclave, 2.0 g. of cis-4-aminomethylcyclohexane-1-carboxylic acid was reacted at 190° C. for 12 hrs. with 20 ml. of pyridine in which 1.2 g. of sodium methylate had been dissolved. The reaction solution was treated in the same manner as in Example 1 and 1.83 g. (yield: 91.5%) of trans-4-aminomethylcyclohexane-1-carboxylic acid was obtained.

Example 8

1.0 g. of a mixture of cis- and trans-4-aminomethyl-cyclohexane-1-carboxylic acid containing 60% by weight of cis-isomer and 0.54 g. of sodium bicarbonate were suspended in 10 ml. of n-octyl alcohol and the mixture was heated under reflux for 10 hrs. The reaction solution was treated in the same manner as in Example 3. The obtained crude crystals were recrystallized from water-acetone-methanol to give 0.82 g. (yield: 82%) of trans-4-aminomethylcyclohexane-1-carboxylic acid having a melting point of 380–390° C. (decomp.).

Example 9

1.0 g. of a mixture of cis- and trans-4-aminomethylcy-clohexane-1-carboxylic acid containing 60% by weight of cis-isomer and 0.57 g. of anhydrous potassium carbonate were suspended in 10 ml. of n-octyl alcohol and the mixture was heated under reflux for 12 hrs. The reaction solution was treated in the same manner as in Example 3 to give 0.80 g. (yield: 80%) of trans-4-aminomethylcy-clohexane-1-carboxylic acid.

Example 10

1.0 g. of a mixture of cis- and trans-4-aminomethyl-cyclohexane-1-carboxylic acid containing 60% by weight of cis-isomer and 0.63 g. of potasisum hydroxide powder were suspended in 10 ml. of 2-ethylhexanol and the mixture was heated under reflux for 7 hrs. The reaction solution was treated in the same manner as in Example 3 to give 0.77 g. (yield: 77%) of trans-4-aminomethyl-cyclohexane-1-carboxylic acid.

Example 11

In an autoclave, 1.6 g. (0.01 mole) of a mixture of cis- and trans-4-aminomethylcyclohexane-1-carboxylic acid containing 60% by weight of cis-isomer, 2.4 g. (0.0075 mole) of barium hydroxide and 10 ml. of water were heated at 200–220° C. for 15 hrs. The reaction solution was diluted with 50 ml. of water and dilute sulfuric acid was added thereto. The precipitated barium sulfate was filtered. The filtrate was concentrated under reduced pressure and the residue was recrystallized from hydrous acetone to give 155 g. of crude crystals. The crystals were further recrystallized from water-methanol-acetone to give 1.4 g. (yield: 89%) of trans-4-aminomethylcyclo-hexane-1-carboxylic acid which had a melting point of 380–390° C. (decomp.) and was free from any inorganic salts. Its melting point and infra-red spectrum agreed well with those of a known sample.

Example 12

In an autoclave, 1.6 g. (0.01 mole) of a mixture of cis- and trans-4-aminomethylcyclohexane - 1 - carboxylic acid containing 70% by weight of cis-isomer, 0.45 g. (0.008 mole) of calcium oxide and 10 ml. of water were heated at 200° C. for 8 hrs. The reaction solution was diluted with 100 ml. of water, added with dilute sulfuric acid, and the precipitated calcium sulfate was filtered. The filtrate was concentrated under reduced pressure. The residue was dissolved in warm water and insoluble substances were eliminated by filtration. The solution was again concentrated to dryness and the residue was dissolved in a small amount of hydrous methanol and filtered. Acetone was added to the filtrate and 1.1 g. (yield: 81%) of trans-4-aminomethylcyclohexane - 1-carboxylic acid having a melting point of 386° C. (decomp.) was obtained.

Example 13

In an autoclave, 1.6 g. (0.01 mole) of a mixture of cis- and trans-4-aminomethylcyclohexane - 1 - carboxylic acid containing 60% by weight of cis-isomer, 2.4 g. (0.0075 mole) of barium hydroxide and 10 ml. of water were heated in the same manner as in Example 11. Carbon dioxide gas was introduced into the reaction solution and the precipitated barium carbonate was filtered. The filtrate was passed through a column of a weakly acidic ion-exchange resin, IRC–50, and the eluate was concentrated under reduced pressure. The residue was recrystallized from hydrous methanol to give 1.45 g. (yield: 90%) of trans-4-aminomethylcyclohexane-1-carboxylic acid.

Example 14

In an autoclave, 1.6 g. (0.01 mole) of a mixture of cis- and trans-4 - aminomethylcyclohexane-1 - carboxylic acid containing 60% by weight of cis-isomer, 0.45 g. (0.008 mole) of calcium oxide and 10 ml. of water were heated in the same manner as in Example 11. A calculated amount of phosphoric acid to combine with the calcium oxide was added to the reaction solution and the precipitate was filtered. The filtrate was treated in the same manner as in Example 11 and 1.4 g. (yield: 89%) of trans-4-amino-methylcyclohexane-1-carboxylic acid was obtained.

Example 15

In an autoclave, 1.6 g. of a mixture of cis- and trans-4-aminomethylcyclohexane-1-carboxylic acid containing 60% by weight of cis-isomer, 0.45 g. of calcium oxide and 10 ml. of water were heated in the same manner as in Example 11. A calculated amount of oxalic acid to combine with the calcium oxide was added to the reaction solution and the precipitate was filtered. The filtrate was treated in the same manner as in Example 11 and 1.4 g. (yield: 89%) of trans - 4 - aminomethylcyclohexane - 1-carboxylic acid was obtained.

Example 16

In an autoclave, 1.6 g. of cis-4-aminomethylcyclohexane-1-carboxylic acid, 2.4 g. of barium hydroxide and 10 ml. of water were heated and treated in the same manner as in Example 11 and 1.4 g. of trans-4-aminomethylcyclohexane-1-carboxylic acid was obtained.

Although the invention has been described with reference to certain specific examples, the invention is not to be limited thereto as numerous modifications and variations in the details of the procedure may be made. For instance, a mixture of two or more of the alkaline agents may be used, a mixture of aqueous and non-aqueous solvents are applicable. The portions of the constituents of the reaction mixture may be varied within wide limits. The time of heating, the temperatures used, the pressures applied, and other details may be changed within the scope of the invention.

What is claimed is:

1. A process for producing trans-4-aminomethylcyclohexane-1-carboxylic acid which comprises heating a member selected from the group consisting of cis-4-aminomethylcyclohexane-1-carboxylic acid and a mixture of cis- and trans-4-aminomethylcyclohexane-1-carboxylic acid at a temperature of between 160° C. and 250° C. in the presence of an alkaline agent selected from the group consisting of alkali metals alcoholates, alkali metals, alkali metal amides, alkali metal hydroxides, alkali metal carbonates, alkali metal bircarbonates, alkaline earth metal oxides and hydroxides in a solvent selected from the group consisting of water, aliphatic alcohols having straight carbon chain, branched carbon chain having 1–8 carbon atoms, alicyclic alcohols and nitrogen-containing heterocyclic amines; and recovering trans-4-aminemethylcyclohexane-1-carboxylic acid from the reaction mixture.

2. A process for producing trans-4-aminomethylcyclohexane-1-carboxylic acid which comprises heating in an autoclave a member selected from the group consisting of cis-4-aminomethylcyclohexane-1-carboxylic acid and a mixture of cis- and trans-4-aminomethylcyclohexane-1-carboxylic acid at a temperature of between 160° C. and 250° C. in water in the presence of alkali metal hydroxides; passing the reaction solution through a column of an acidic cation ion-exchange resin; and recovering trans-4-aminomethylcyclohexane-1-carboxylic acid from the eluate.

3. A process according to claim 2, in which the alkali metal hydroxide is sodium hydroxide.

4. A process for producing trans-4-aminomethylcyclohexane-1-carboxylic acid which comprises heating a member selected from the group consisting of cis-4-aminomethylcyclohexane-1-carboxylic acid and a mixture of cis and trans-4-aminomethyllcyclohexane-1-carboxylic acid at a temperature of between 160° C. and 250° C. in water in the presence of alkaline earth metal hydroxides; introducing carbon dioxide gas into the reaction solution; removing precipitated alkaline earth metal carbonates by filtration; and recovering trans-4-aminomethylcyclohexane-1-carboxylic acid from the filtrate.

5. A process for producing trans-4-aminomethylcyclohexane-1-carboxylic acid which comprises heating a member selected from the group consisting of cis-4-aminomethylcyclohexane-1-carboxylic acid and a mixture of cis- and trans-4-aminomethylcyclohexane - 1 - carboxylic acid at a temperature of between 160° C. and 250° C. in water in the presence of alkaline earth metal oxides; introducing carbon dioxide gas into the reaction solution; removing precipitated alkaline earth metal carbonates by filtration; and recovering trans-4-aminomethylcyclohexane-1-carboxylic acid from the filtrate.

6. A process for producing trans-4-aminomethylcyclohexane-1-carboxylic acid which comprises heating a member selected from the group consisting of cis-4-aminomethylcyclohexane-1-carboxylic acid and a mixture of cis- and trans-4-aminomethylcyclohexane-1-carboxylic acid at a temperature of between 160° C. and 250° C. in water in the presence of alkaline earth metal hydroxides; adding an acid selected from the group consisting of sulfuric acid, phosphoric acid and oxalic acid to the reaction solution to precipitate a corresponding alkaline earth metal salt; removing the salt by filtration; and recovering trans-4-aminomethylcyclohexane - 1 - carboxylic acid.

7. A process according to claim 6, in which the alkaline earth metal hydroxide is calcium hydroxide.

8. A process according to claim 6, in which the alkaline earth metal hydroxide is barium hydroxide.

9. A process for producing trans-4-aminomethylcyclohexane-1-carboxylic acid which comprises heating a member selected from the group consisting of cis-4-aminomethylcyclohexane-1-carboxylic acid and a mixture of cis- and trans-4-aminomethylcyclohexane-1-carboxylic acid at a temperature of between 160° and 250° C. in water in the presence of alkaline earth metal oxides; adding an acid selected from the group consisting of sulfuric acid, phosphoric acid and oxalic acid to the reaction solution to precipitate a corresponding alkaline earth metal salt; removing the salt by filtration; and recovering trans-4-aminomethylcyclohexane-1-carboxylic acid.

10. A process according to claim 9, in which the alkaline earth metal oxide is calcium oxide.

11. A process according to claim 9, in which the alkaline earth metal oxide is barium oxide.

12. A process for producing trans-4-aminomethylcyclohexane-1-carboxylic acid which comprises heating a member selected from the group consisting of cis-4-aminomethylcyclohexane-1-carboxylic acid and a mixture of trans- and cis-4-aminomethylcyclohexane-1-carboxylic acid at an elevated temperature of about 160° C. and below the decomposition temperatures of said substances, in the presence of a sufficient amount of an alkaline agent to cause isomerization of the cis- into the trans-compound and in the presence of a solvent selected from the group consisting of water, monoalcohols having from 1 to 8 carbon atoms, alicyclic alcohols and heterocyclic amines, said alkaline agent selected from the group consisting of alkali metal and alkaline earth metal hydroxides, oxides, amides, carbonates and bicarbonates, and recovering the trans-compound from the reaction mixture.

(References on following page)

References Cited

UNITED STATES PATENTS 3,046,299  7/1962  Julia _____ 260—514

OTHER REFERENCES

Gilman, H.: Organic Chemistry—An Advanced Treatise, vol. 1, 1943, p. 453.

Calmon et al.: Ion Exchangers in Organic and Biochemistry, 1957, chapter 35, pp. 640–655.

Remy, H.: Treatise on Inorganic Chemistry, vol. 1, 1956, pp. 274–278; 278–83; 450–53; 637.

LORRAINE A. WEINBERGER, Primary Examiner

PAUL KILLOS, Assistant Examiner